United States Patent
Franke

(10) Patent No.: US 7,733,038 B2
(45) Date of Patent: Jun. 8, 2010

(54) SWITCHING DEVICE FOR LINKING VARIOUS ELECTRICAL VOLTAGE LEVELS IN A MOTOR VEHICLE

(75) Inventor: Torsten Franke, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 293 days.

(21) Appl. No.: 11/905,973

(22) Filed: Oct. 5, 2007

(65) Prior Publication Data

US 2008/0048605 A1 Feb. 28, 2008

Related U.S. Application Data

(63) Continuation of application No. PCT/EP2006/002110, filed on Mar. 8, 2006.

(30) Foreign Application Priority Data

Apr. 6, 2005 (DE) .................. 10 2005 015 658

(51) Int. Cl.
*H02P 5/00* (2006.01)
(52) U.S. Cl. .............. 318/105; 318/139; 318/440; 318/109; 318/106; 320/104; 320/138; 320/145; 320/166; 363/37; 363/10; 363/16; 363/27; 363/56.01; 363/127; 307/18
(58) Field of Classification Search ........... 318/105, 318/440, 139, 700, 792, 794, 814, 508; 307/43, 307/46, 48, 66, 75; 320/138, 166; 322/86, 322/88
See application file for complete search history.

(56) References Cited

U.S. PATENT DOCUMENTS 3,737,745 A * 6/1973 Chevaugeon et al. .......... 318/52
4,035,709 A * 7/1977 Seider et al. ................ 320/158
4,114,082 A * 9/1978 Scheidler .................... 320/117
4,239,978 A * 12/1980 Kofink ........................ 307/16

(Continued)

FOREIGN PATENT DOCUMENTS

DE 42 26 311 A1 2/1994

(Continued)

OTHER PUBLICATIONS

International Search Report dated May 19, 2006 w/English translation (six (6) pages).

(Continued)

*Primary Examiner*—Rita Leykin
(74) *Attorney, Agent, or Firm*—Crowell & Moring LLP

(57) ABSTRACT

Switching device for linking various electrical voltage levels in a motor vehicle, in which a drive voltage level has an electric drive machine which may be actuated by a power converter, and a drive energy accumulator which is associated with an intermediate circuit, and in which the drive voltage level is connected to a vehicle electrical system voltage level by an electrical converter. The electrical converter is designed as a coupling circuit which is connected at the drive side to at least one node point of a winding circuit of the electric drive machine and to a voltage potential relative to the intermediate circuit. The coupling circuit is connected at the vehicle electrical system side to the vehicle electrical system via a switching unit which has at least one non-diminishing, finite impedance.

20 Claims, 6 Drawing Sheets

U.S. PATENT DOCUMENTS

| | | | |
|---|---|---|---|
| 4,420,015 A * | 12/1983 | Blaser | 137/852 |
| 4,896,090 A * | 1/1990 | Balch et al. | 318/52 |
| 5,483,436 A * | 1/1996 | Brown et al. | 363/98 |
| 5,502,368 A * | 3/1996 | Syverson et al. | 322/28 |
| 5,629,596 A * | 5/1997 | Iijima et al. | 318/762 |
| 5,703,472 A * | 12/1997 | Aoyama et al. | 322/28 |
| 6,049,198 A | 4/2000 | Schenk | |
| 6,066,928 A * | 5/2000 | Kinoshita et al. | 318/139 |
| 6,188,139 B1 * | 2/2001 | Thaxton et al. | 290/4 R |
| 6,288,881 B1 * | 9/2001 | Melvin et al. | 361/18 |
| 6,320,274 B1 | 11/2001 | Goetze et al. | |
| 6,335,575 B1 | 1/2002 | Reutlinger et al. | |
| 6,384,489 B1 * | 5/2002 | Bluemel et al. | 307/10.1 |
| 6,476,571 B1 * | 11/2002 | Sasaki | 318/139 |
| 6,919,711 B2 * | 7/2005 | Haydock et al. | 322/24 |
| 6,985,799 B2 * | 1/2006 | Zalesski et al. | 700/286 |
| 2003/0151387 A1 * | 8/2003 | Kumar | 320/104 |
| 2003/0233959 A1 * | 12/2003 | Kumar | 105/26.05 |

FOREIGN PATENT DOCUMENTS

| | | |
|---|---|---|
| DE | 195 19 298 A1 | 11/1996 |
| DE | 197 52 661 A1 | 6/1999 |
| DE | 198 38 296 A1 | 3/2000 |
| DE | 600 00 294 T2 | 3/2003 |
| DE | 103 13 752 A1 | 10/2004 |
| DE | 600 22 460 T2 | 6/2006 |
| EP | 1 112 896 B1 | 7/2001 |
| FR | EP-1112896 * | 7/2001 |
| WO | WO 03/067737 A1 | 8/2003 |

OTHER PUBLICATIONS

German Search Report dated Feb. 26, 2007 w/English translation of pertinent portion (nine (9) pages).

* cited by examiner

SWITCHING DEVICE FOR LINKING VARIOUS ELECTRICAL VOLTAGE LEVELS IN A MOTOR VEHICLE

CROSS REFERENCE TO RELATED APPLICATIONS

This application is a continuation of PCT International Application No. PCT/EP2006/002110, filed Mar. 8, 2006, which claims priority under 35 U.S.C. §119 to German Patent Application No. 10 2005 015 658.4, filed Apr. 6, 2005, the entire disclosures of which are herein expressly incorporated by reference.

BACKGROUND AND SUMMARY OF THE INVENTION

The present invention relates to a switching device for linking various electrical voltage levels in a motor vehicle, in which a drive voltage level has an electric drive machine which may be actuated by a power converter, and a drive energy accumulator which is associated with an intermediate circuit, and in which the drive voltage level is connected to a vehicle electrical system voltage level by means of an electrical converter.

In automotive manufacturing, electrical machines are used for electric and hybrid vehicles. On account of their good control capability and performance, rotary current drives having different numbers of phases and pairs of poles in both asynchronous and synchronous designs are finding increasing acceptance as drives. From a design standpoint, the aim is to provide the highest possible voltage (200-300 V) to the drive in order to reduce power loss to a minimum at a high power density. The voltage level of 12V typically used in the vehicle, or 42 V planned in the future, cannot be advantageously used for a high-power drive. Therefore, coupling of the voltage levels of a high-power drive and a vehicle electrical system requires additional adaptive devices. In particular, when the high-power drive (generator function) is intended to assume the function of supplying the vehicle electrical system, implementation of such adaptive elements is very complicated.

It is known from the general prior art, for example from DE 103 13 752 A1, to connect various voltage levels in multivoltage vehicle electrical systems in motor vehicles by means of a (bidirectional) DC/DC converter. In particular, for hybrid and electric vehicles it is known to provide a DC/DC converter between a drive energy accumulator or an intermediate circuit and the vehicle electrical system.

A disadvantage of the known technology is that it results in great system complexity, high system costs, large installation space requirements, and added weight. For example, for a vehicle electrical system power output of 4 kW, a DC/DC converter requires an installation space of at least 5 liters and weighs more than 10 kg. Further expenses result from additional devices, such as cooling and monitoring, which are necessary for reliable operation of the DC/DC converter.

An object of the present invention, therefore, is to provide a switching device for linking various voltage levels in a motor vehicle, which for at least the same functionality as a DC/DC converter is simpler and more economical.

This and other objects and advantages are achieved in accordance with exemplary embodiments of the present invention in which the electrical converter is designed as a coupling circuit, which on the drive side is connected to at least one node point of a winding circuit of the electrical drive machine and to a voltage potential relative to the intermediate circuit, at the vehicle electrical system side the coupling circuit being connected to the vehicle electrical system via a switching unit which has at least one non-diminishing, finite impedance.

According to the invention, the electrical machine itself is used for linking the voltage levels of the electrical machine and the vehicle electrical system. The vehicle electrical system is directly coupled to the electrical machine via the coupling circuit. This circuit makes use of the fact that the potential of the node point may be adjusted by actuating the power converter, at least in a stepwise manner, between the potentials of the intermediate circuit. The frequency of the node point voltage relative to the intermediate circuit is independent of the frequency of the resulting field at the electrical machine to be controlled.

By means of this additional degree of freedom it is possible to adjust the power flow in the coupling circuit in a wide range, independent of the mechanical power output of the electrical machine. The adjustment capability is limited only by the effective impedance of the original circuit and the additional circuit. The coupling circuit may be designed for monodirectional or bidirectional power flow; i.e., the intermediate circuit (including the connected drive energy accumulator) may be supplied from the vehicle electrical system, and the vehicle electrical system may be supplied from the intermediate circuit. The coupling circuit is operable in any working range of the electrical machine. In particular, the direction of the power flow within the coupling circuit is not dependent on the working quadrant (magnetization curve) of the electrical machine.

The complexity of the coupling of the various voltage levels is minimized by use of the switching device according to the invention. In particular, this means no additional magnetic elements, fewer semiconductor components, fewer actuating devices, less cost for the connection technology, and lower design costs for cooling and a housing. The additional elements may be integrated into the power converter or power inverter portion of the drive, using the technologies already employed therein. Reduction of the complexity results in lowered costs associated with the system, the installation space, and the weight. Compared to a classical DC/DC converter of the same functionality connected between the voltage levels, the outlays for complexity, installation space, weight, and costs are reduced by more than two-thirds.

The coupling circuit according to the invention may be connected in a particularly simple manner in the form of a bidirectional converter. Additional functionality is achieved in comparison to conventional circuits using DC/DC converters, in that the drive energy accumulator, having higher voltage compared to a vehicle electrical system or vehicle electrical system energy accumulator (vehicle battery), does not have to be supplied from the vehicle electrical system when the vehicle is not in use. This minimizes storage losses from the drive energy accumulator. In particular, the drive energy accumulator may actively discharge into the vehicle electrical system when the vehicle is shut off, and upon start-up of the vehicle may be recharged in a very short time.

A further advantage is that the electrical machine may also be supplied with drive power directly from the vehicle electrical system via appropriate control, or may also act directly as a generator power converter between the mechanical output and the vehicle electrical system. The efficiency chain of the energy conversion may be shortened compared to a conventional circuit using a DC/DC converter, with the result that the overall system has a correspondingly higher efficiency for the conversion between electrical energy and mechanical energy. Due to the possibility of direct power conversion between the vehicle electrical system and the mechanical output, this may also provide emergency operation in the event of a defective energy accumulator in the higher-voltage level, or for a (partially) defective current converter or inverter. Both a starter and a generator function may be provided by the direct coupling of the vehicle electrical system and the electrical machine.

According to one exemplary embodiment of the invention, the electrical drive machine is designed as a multiphase rotary current machine which is connected to a winding circuit designed as a star connection, and which may be actuated by a power converter designed as a current inverter, and the coupling circuit is connected on the drive side to at least one node point designed as a neutral point in the star connection of the rotary current machine.

The coupling circuit may be connected to a star connection in a particularly efficient manner. The vehicle electrical system is connected via the coupling circuit to the neutral point (node point) of the multiphase machine connected in the star, and is also connected to the potential relative to the intermediate circuit or the energy accumulator. The potential of the neutral point may be adjusted between the potentials of the intermediate circuit by actuating the current inverter (converter).

In principle, the coupling circuit according to the invention is suited not only for a "classical" three-phase rotary current machine or a rotary current machine having more than three phases, but may also be used for a single-phase brushless direct current machine, i.e., a single-phase motor. It is important for the machine to allow a winding tap for a motor coil.

According to another exemplary embodiment of the invention, the voltage potential relative to the intermediate circuit is specified by the midpoint of an intermediate circuit voltage. In this manner the coupling device for the vehicle electrical system as well as the electrical machine may be operated in electrical symmetry, once again resulting in simpler regulation and control designs than for a configuration directly at a coupling voltage related to an intermediate circuit potential.

According to another exemplary embodiment of the invention, a voltage limiting unit is provided, by use of which overvoltages occurring at one or more node points of the winding circuit may be limited. The voltage limiting unit may be designed as electrical clamping elements. By clamping the node point or neutral point with respect to the intermediate circuit, overvoltages created by a controller for the vehicle electrical system voltage may be limited at the neutral point. Additional clamping elements, for example clamping diodes, may be omitted when appropriate use is made of the magnetic flux coupling in the electrical machine, or the individual inductances in a flux equilibrium are controlled. Clamping may also be performed by capacitive discharge of the neutral point.

According to another exemplary embodiment of the invention, for an electrical machine having multiple node points associated with the star circuit, the coupling circuit is situated between the node points. In this manner, during advantageous control, the intermediate circuit is not subjected to stress from the ripple current (charging current and discharging current) which occurs.

According to another exemplary embodiment of the invention, control of the coupling of the voltage levels is integrated into a control unit for the electrical machine. This allows good control capability, even in the load limit range of the system, with relatively low system complexity.

According to a further exemplary embodiment of the invention, the vehicle electrical system and the winding circuit are coupled via an isolating transformer. This allows an energy exchange between the circuit areas with a secure electrical (galvanic) separation. A further advantage is that the capacitive load on the neutral point is minimized, and the current received by the vehicle electrical system still appears in converted form in the drive energy accumulator, current inverter, and electrical machine. This allows the design of individual components of the switching device to be optimized.

Other objects, advantages and novel features of the present invention will become apparent from the following detailed description of the invention when considered in conjunction with the accompanying drawings.

DETAILED DESCRIPTION OF THE DRAWINGS

A switching device for linking various electrical voltage levels in a motor vehicle includes a coupling circuit 4 by means of which an electrical machine 3 is directly connected to a vehicle electrical system 5.

Figure 1A:
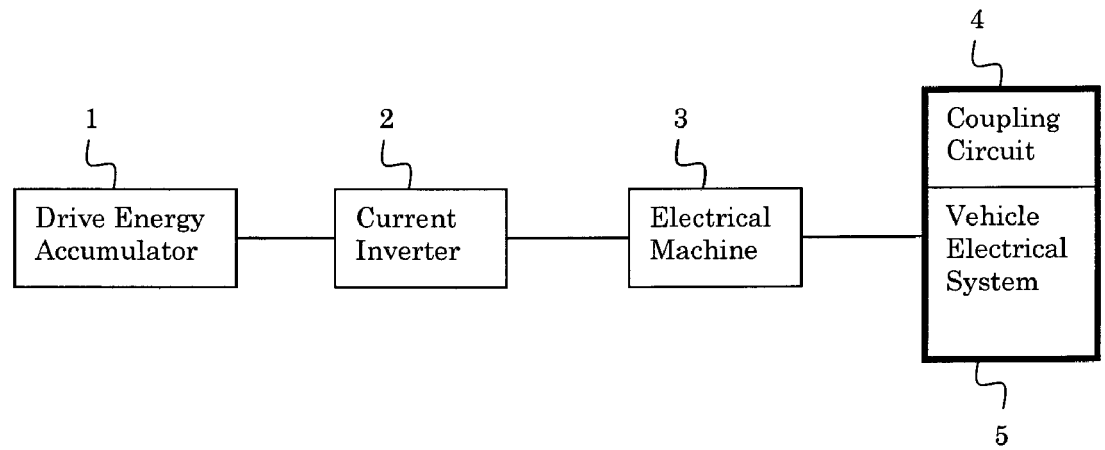
FIG. 1a shows a block diagram of a coupling between a vehicle electrical system and a drive energy accumulator.
Figure 1B:
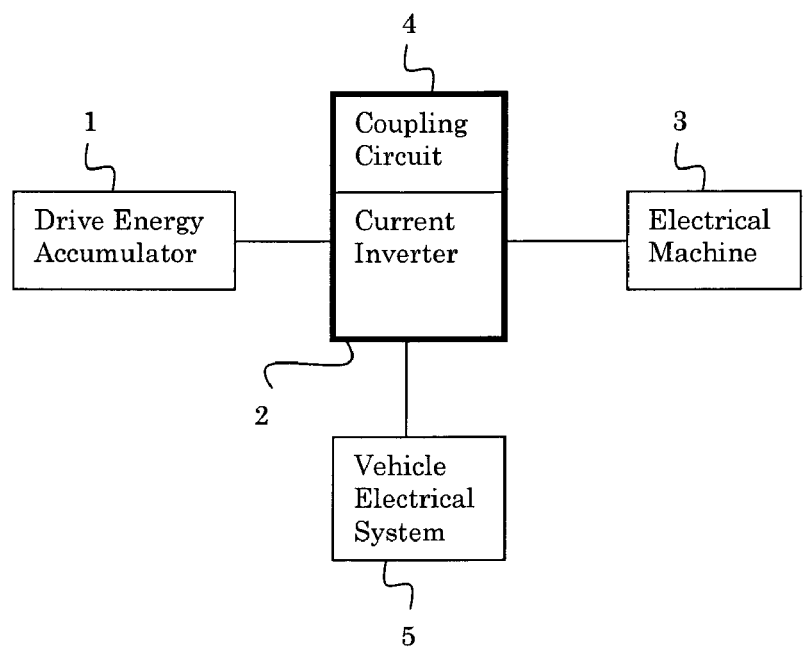
FIG. 1b shows a second block diagram of a coupling between the vehicle electrical system and the drive energy accumulator.

FIGS. 1a and 1b show two possible circuit structures of the coupling of the vehicle electrical system 5 and a drive energy accumulator 1 in a vehicle having an electric drive (hybrid vehicle having an internal combustion engine and an electric motor, or electric vehicle). The drive energy accumulator 1, a current inverter 2, the electrical machine 3, and the vehicle electrical system 5 may be consecutively connected by circuitry, whereby a neutral point converter, represented by the coupling circuit 4, is an integral component of the vehicle electrical system circuitry (FIG. 1a). The neutral point converter may also be designed as an integral component of the current inverter 2 (FIG. 1b). For example, the vehicle electrical system 5 is a 12-V system having power requirements of less than 4 kW, the drive energy accumulator 1 is a 200-V accumulator, the current inverter 2 is designed for a power output of 100 kVA, and the electrical machine 3 has a power output of approximately 50 kW. A 12-V voltage level and a 200-V voltage level are correspondingly provided.

Figure 2:
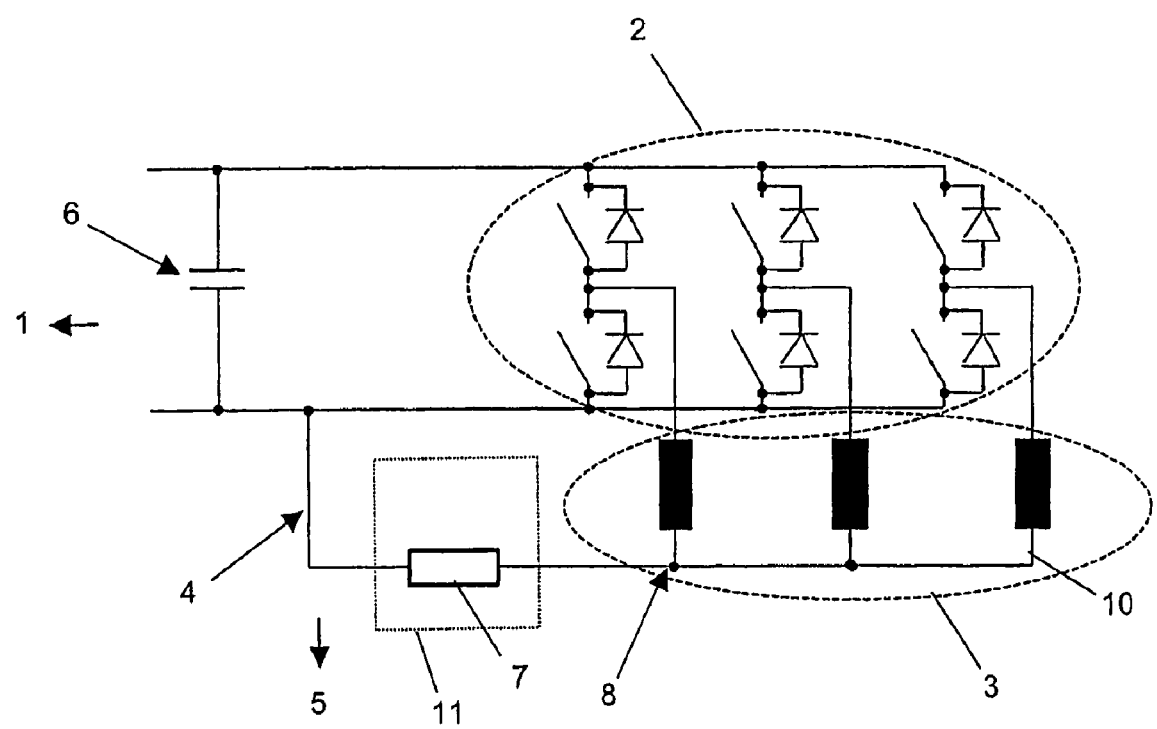
FIG. 2 shows a circuit diagram for the direct coupling between an electrical machine and the vehicle electrical system.

FIG. 2 shows a circuit diagram of the circuitry structure for a three-phase electrical machine. The vehicle electrical system 5 is coupled via an impedance 7 (equivalent impedance) in a neutral point 8 (node point) of a star circuit 10 (winding circuit). Connected upstream from the three-phase machine 3 is the current inverter 2 which actuates the machine 3. The current inverter 2 is connected to an intermediate circuit 6, with which the drive energy accumulator 1 is associated. The machine 3 may be operated as a motor and as a generator. The coupling circuit 4 is advantageously designed as a bidirectional circuit, so that the intermediate circuit 6 may be supplied from the vehicle electrical system 5 and, conversely, the vehicle electrical system 5 may be supplied from the intermediate circuit 6.

FIGS. 3 through 10 show various embodiments of the switching device. In the figures, the current inverter 2 and a circuit unit 11 for the coupling circuit 4 essentially have different designs. The circuit examples show that the individual switching elements have various dimensions based on the applied voltages and currents, resulting in different optimal factors for the complexity of the semiconductor. The listing of circuit examples is not exhaustive. Among other approaches, further circuit variants having the characteristics according to the invention are possible by the stepwise interconversion of individual circuits, taking into account the limiting control conditions.

Figure 3:
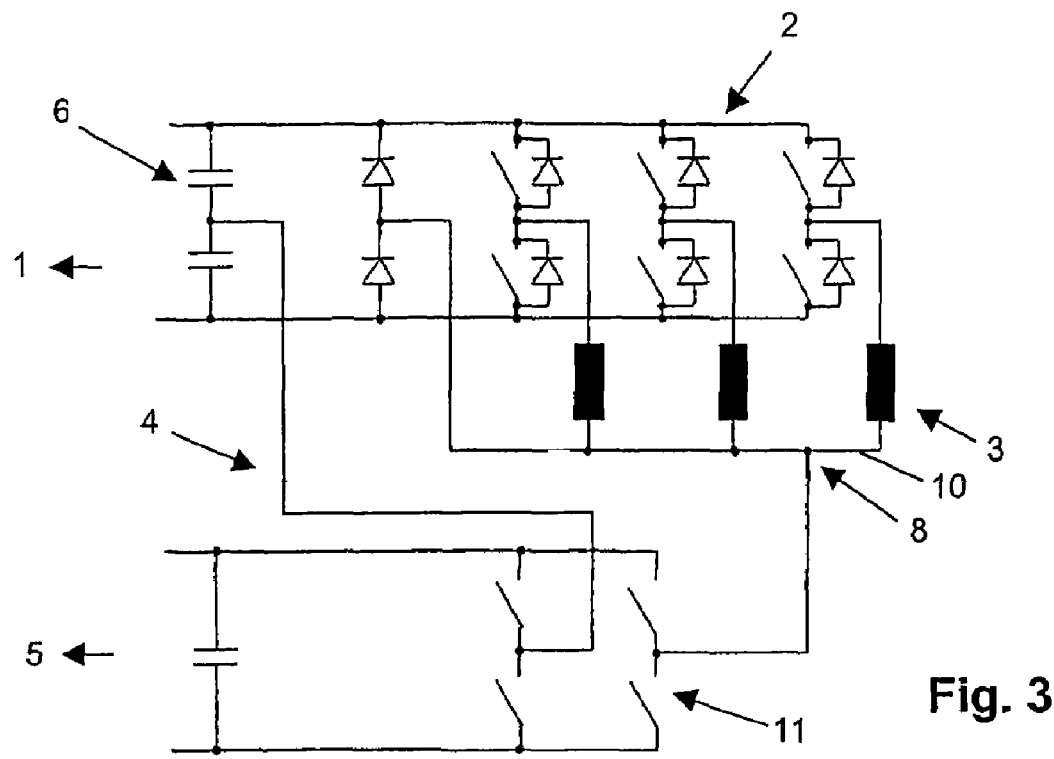
FIG. 3 shows a first embodiment of a coupling circuit between the electrical machine and the vehicle electrical system.
Figure 6:
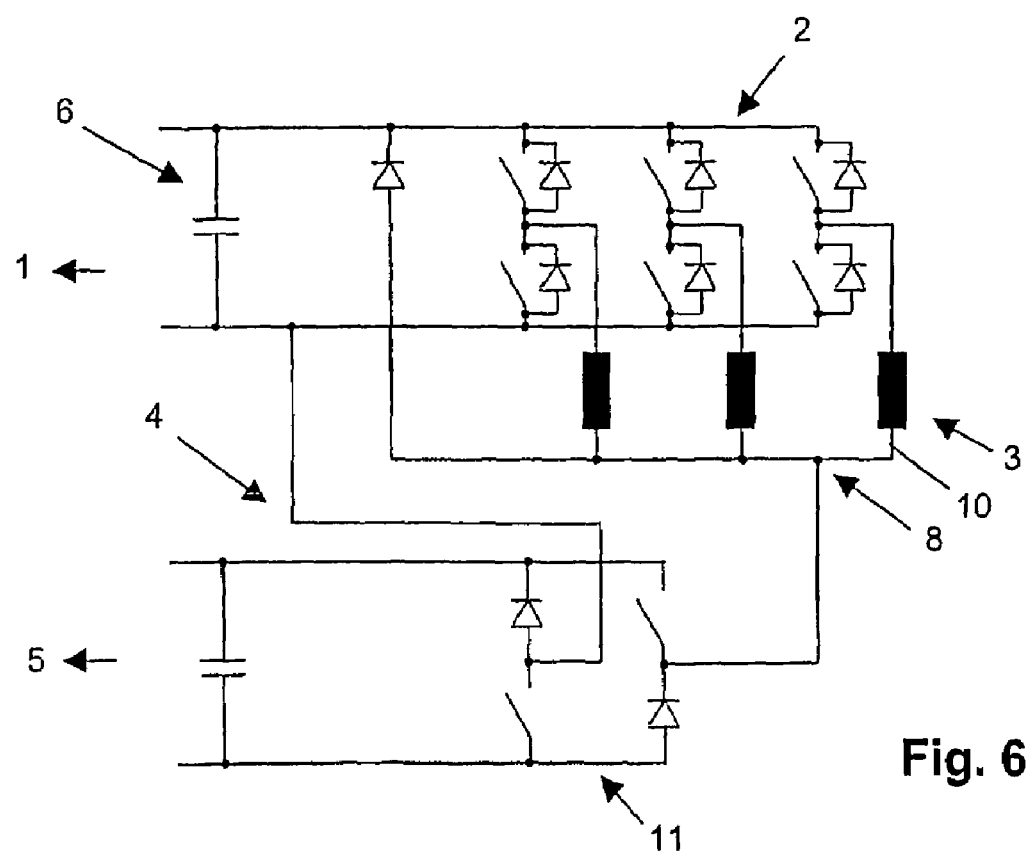
FIG. 6 shows a fourth embodiment of the coupling circuit.
Figure 7:
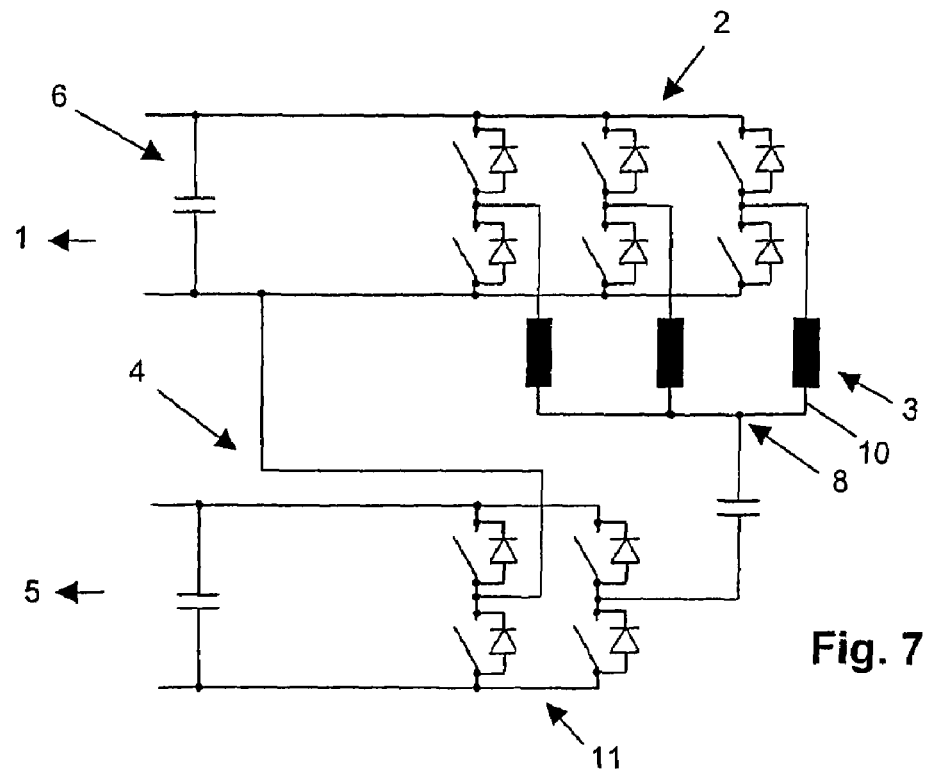
FIG. 7 shows a fifth embodiment of the coupling circuit.

The circuit according to FIG. 3 allows a bidirectional power flow between the energy accumulators (drive energy accumulator 1 and vehicle electrical system energy accumulator, i.e., the vehicle battery) for the voltage levels. The electrical machine 3 may be supplied from both energy accumulators. In principle, the function of the circuit is not dependent on the type of individual switch for the circuit component 11. Two additional exemplary embodiments having the same characteristics are shown in FIGS. 6 and 7.

Figure 4:
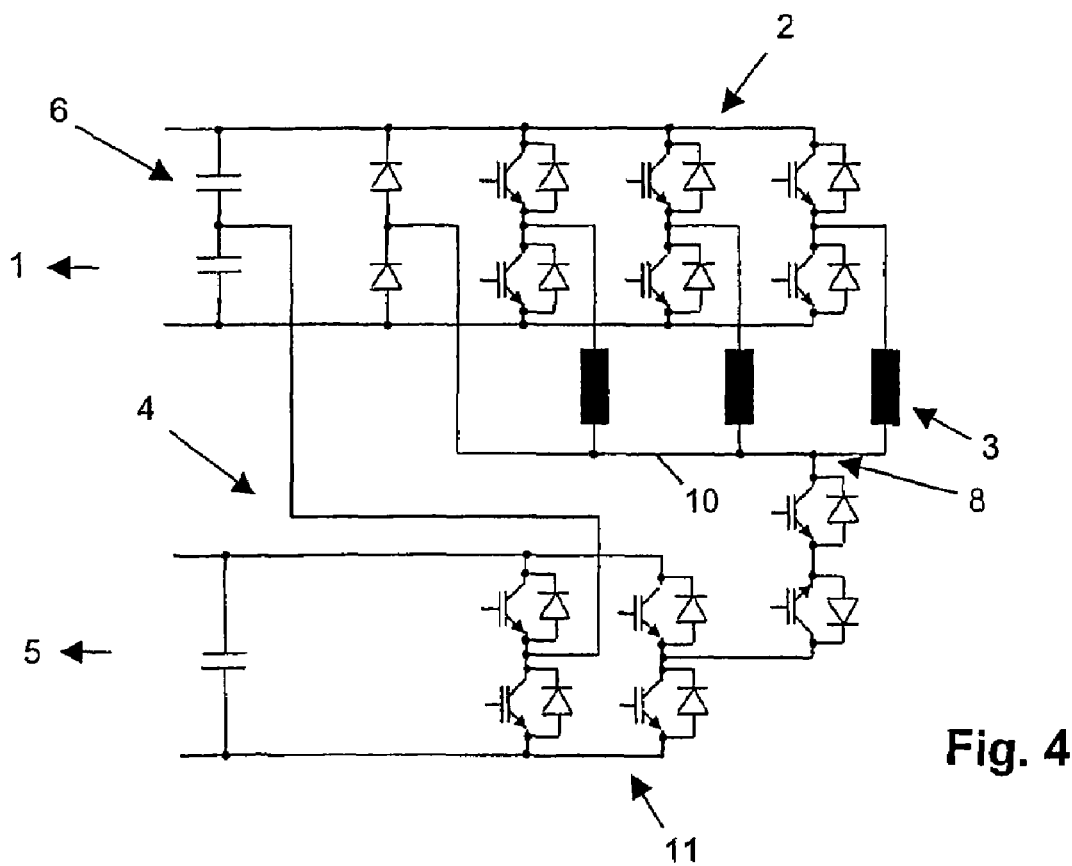
FIG. 4 shows a second embodiment of the coupling circuit.

The block diagram in FIG. 4 shows a circuit in which (commercially available) transistors are used as switching elements, and which otherwise has the same function as in FIG. 3.

Figure 5:
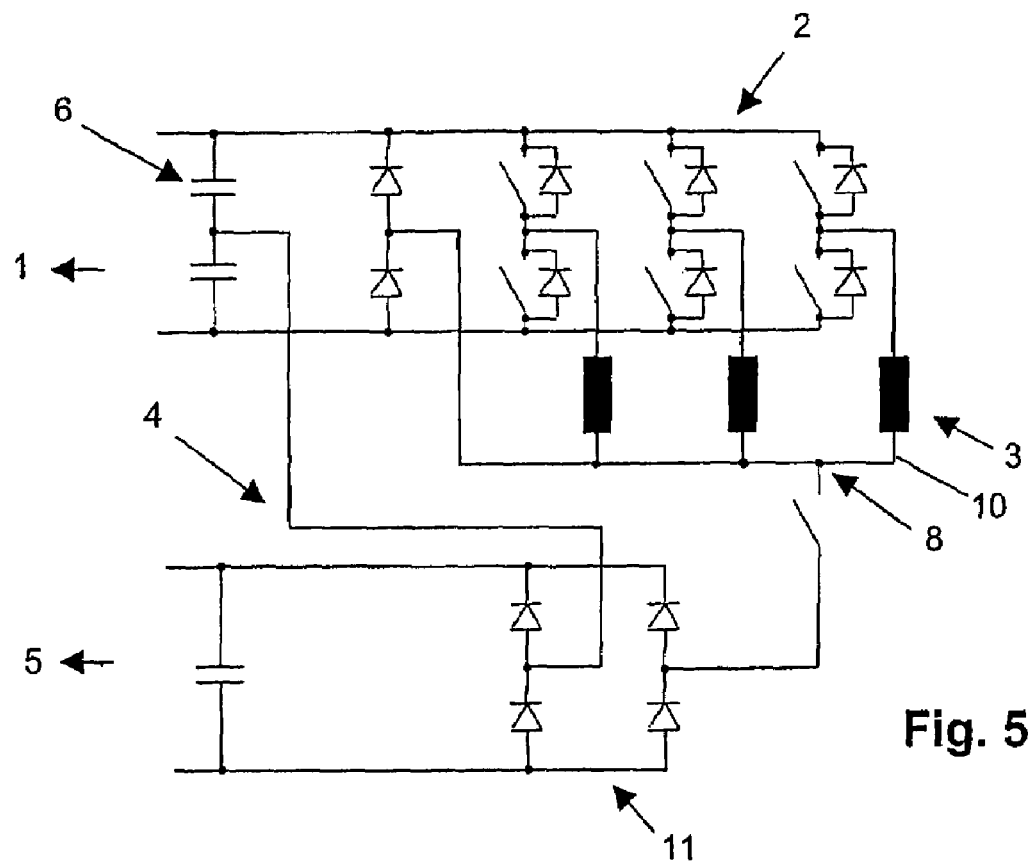
FIG. 5 shows a third embodiment of the coupling circuit.

The exemplary embodiment in FIG. 5 shows a circuit for a monodirectional power flow from the drive energy accumulator 1 and the electrical machine 3 into the vehicle electrical system 5. This circuit allows the machine 3 to be operated from the drive energy accumulator 1.

Figure 8:
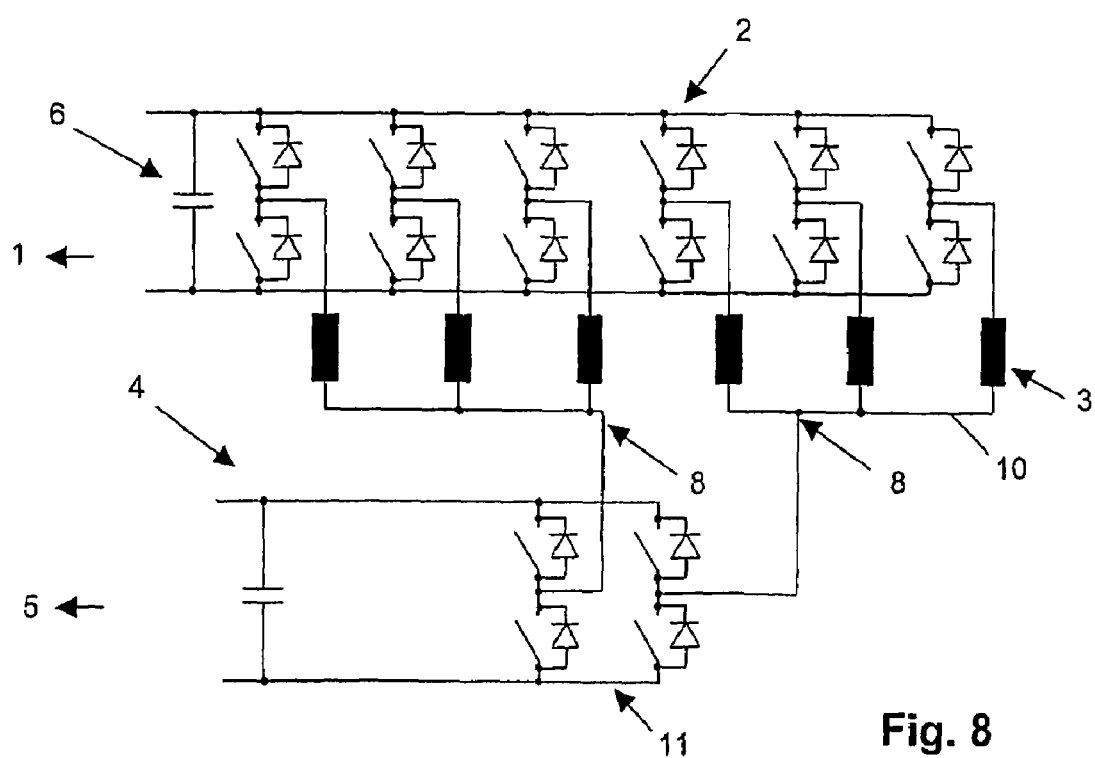
FIG. 8 shows a sixth embodiment of the coupling circuit.

FIG. 8 shows a circuit having a split star circuit 10, i.e., having two neutral points 8. In this case the coupling circuit 4 or the switching unit 11 is situated between the node points 8. Otherwise, this circuit corresponds to the mode of functioning of the circuits from FIGS. 3, 6, and 7.

Figure 9:
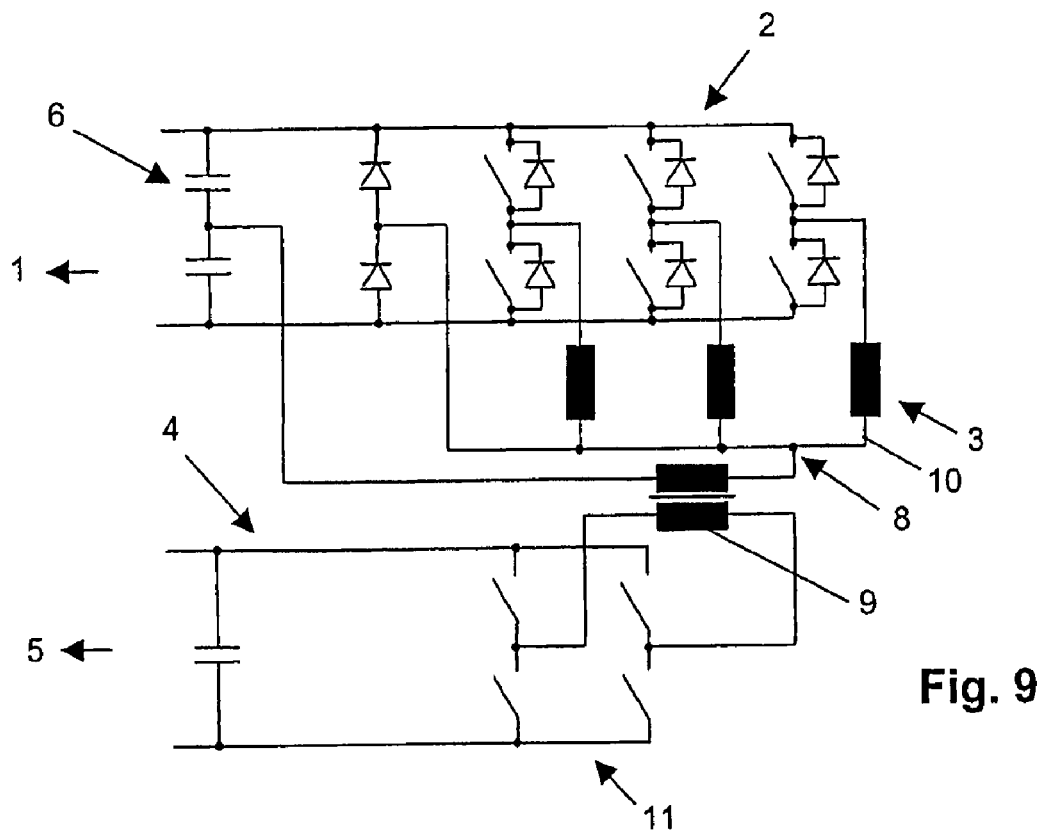
FIG. 9 shows a seventh embodiment of the coupling circuit.
Figure 10:
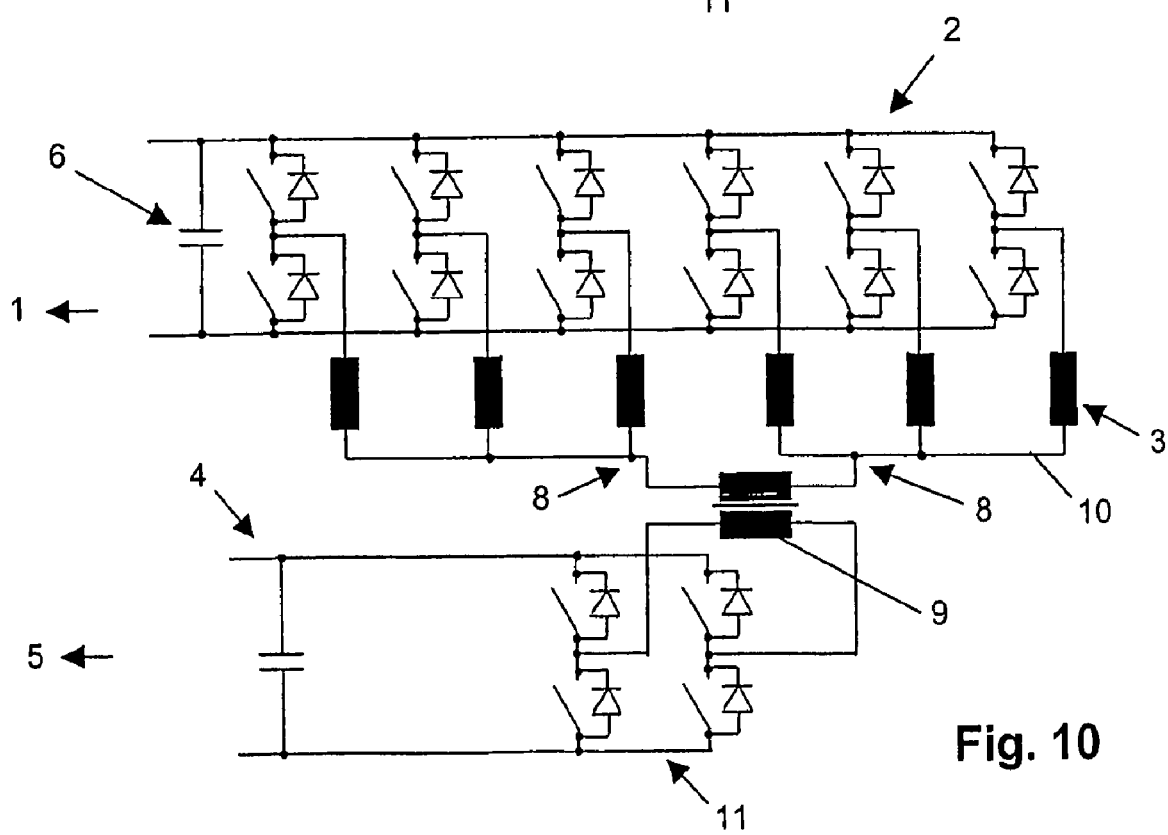
FIG. 10 shows an eighth embodiment of the coupling circuit.

The circuit in FIG. 9 has an isolating transformer 9 which divides the star circuit 10 and the switching unit 11. This circuit allows a bidirectional power flow as well as a separation of potential between the energy accumulators. Here as well, the machine 3 may be operated from both energy accumulators (drive and vehicle electrical system). Lastly, the circuit in FIG. 10 once again has a split star circuit 10, and otherwise corresponds to the design according to FIG. 9.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A switching device for linking various electrical voltage levels in a motor vehicle, in which a drive voltage level has an electric drive machine which may be actuated by a power converter, and a drive energy accumulator which is associated with an intermediate circuit, and in which the drive voltage level is connected to a vehicle electrical system voltage level by an electrical converter, wherein the electrical converter is designed as a coupling circuit is connected at the drive side to at least one node point of a winding circuit of the electric drive machine and to a voltage potential relative to the intermediate circuit, and at the vehicle electrical system side the coupling circuit is connected to the vehicle electrical system via a switching unit which has at least one non-diminishing, finite impedance.

2. The switching device according to claim 1, wherein the electric drive machine is designed as a multiphase rotary current machine which is connected to a winding circuit designed as a star connection, and which may be actuated by a power converter designed as a current inverter, and the coupling circuit is connected on the drive side to at least one node point designed as a neutral point in the star connection of the rotary current machine.

3. The switching device according to claim 1, wherein the voltage potential relative to the intermediate circuit is specified by the midpoint of an intermediate circuit voltage.

4. The switching device according to claim 1, further comprising:
a voltage limiting unit configured to limit overvoltages occurring at one or more node points of the winding circuit.

5. The switching device according to claim 4, wherein the voltage limiting unit is designed as an electrical clamping element.

6. The switching device according to claim 1, wherein for an electrical machine having multiple node points associated with the winding circuit the coupling circuit is situated between the node points.

7. The switching device according to claim 1, wherein control of the coupling of the voltage levels is integrated into a control unit for the electrical machine.

8. The switching device according to claim 1, wherein the vehicle electrical system and the winding circuit are coupled via an isolating transformer.

9. The switching device according to claim 1, wherein the coupling circuit is designed as a bidirectional circuit.

10. The switching device according to claim 1, wherein the electrical machine is designed as a three-phase rotary current machine.

11. The switching device according to claim 2, wherein the voltage potential relative to the intermediate circuit is specified by the midpoint of an intermediate circuit voltage.

12. The switching device according to claim 2, further comprising:
a voltage limiting unit configured to limit overvoltages occurring at one or more node points of the winding circuit.

13. The switching device according to claim 2, wherein for an electrical machine having multiple node points associated with the winding circuit the coupling circuit is situated between the node points.

14. The switching device according to claim 2, wherein control of the coupling of the voltage levels is integrated into a control unit for the electrical machine.

15. The switching device according to claim 2, wherein the vehicle electrical system and the winding circuit are coupled via an isolating transformer.

16. The switching device according to claim 2, wherein the coupling circuit is designed as a bidirectional circuit.

17. The switching device according to claim 2, wherein the electrical machine is designed as a three-phase rotary current machine.

18. The switching device according to claim 3, further comprising:

a voltage limiting unit configured to limit overvoltages occurring at one or more node points of the winding circuit.

19. A switching device configured to link a plurality of electric voltage levels in a motor vehicle, comprising:
   an electronic drive machine that has a drive voltage level and is actuatable by a power converter;
   a drive energy accumulator associated with an intermediate circuit of the switching device; and
   an electrical converter that connects the drive voltage level to a vehicle electrical system voltage level and is designed as a coupling circuit connected at the drive side to at least one node point of a winding circuit of the electric drive machine and to a voltage potential relative to the intermediate circuit, and at the vehicle electrical system side the coupling circuit is connected to the vehicle electrical system via a switching unit which has at least one non-diminishing, finite impedance.

20. The switching device according to claim 19, wherein the electric drive machine is designed as a multiphase rotary current machine which is connected to a winding circuit designed as a star connection, and which may be actuated by a power converter designed as a current inverter, and the coupling circuit is connected on the drive side to at least one node point designed as a neutral point in the star connection of the rotary current machine.

* * * * *